United States Patent
Hamasaki et al.

(10) Patent No.: US 7,201,262 B2
(45) Date of Patent: *Apr. 10, 2007

(54) ONE-WAY ROTATIONAL TRANSFER MECHANISM

(75) Inventors: Takuji Hamasaki, Saitama (JP); Makoto Iikawa, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/952,727

(22) Filed: Sep. 30, 2004

(65) Prior Publication Data

US 2005/0072646 A1 Apr. 7, 2005

(30) Foreign Application Priority Data

Oct. 2, 2003 (JP) .............................. 2003-344808

(51) Int. Cl.
*F16D 15/00* (2006.01)
(52) U.S. Cl. .......................................... 192/38; 192/45
(58) Field of Classification Search ................... 192/38, 192/223.2
See application file for complete search history.

(56) References Cited

U.S. PATENT DOCUMENTS

| 4,982,823 A * | 1/1991 | Yoshida ........................ 192/38 |
| 5,915,514 A | 6/1999 | Nojiri et al. |
| 2005/0087416 A1 * | 4/2005 | Iikawa et al. .................. 192/44 |
| 2005/0094992 A1 * | 5/2005 | Hamasaki et al. .......... 396/144 |
| 2005/0183917 A1 * | 8/2005 | Hamasaki et al. ............. 192/45 |

FOREIGN PATENT DOCUMENTS

| JP | 8-177878 | 7/1996 |
| JP | 11-202181 | 7/1999 |

OTHER PUBLICATIONS

U.S. Appl. No. 10/971,118 to Iikawa et al., filed Oct. 25, 2004.

* cited by examiner

*Primary Examiner*—Richard M. Lorence
(74) *Attorney, Agent, or Firm*—Greenblum & Bernstein, P.L.C.

(57) ABSTRACT

A one-way rotational transfer mechanism includes a rotary input shaft; a rotary output shaft provided around the rotary input shaft; a circumferentially-uneven-width-space forming portion formed on the rotary input shaft to form at least one accommodation space having different radial widths at different circumferential positions; a differential rotating member installed in the accommodation space, the differential rotating member revolving around the axis of the rotary input shaft in a same direction as a rotational direction of the rotary input shaft while revolving at a slower speed; and a freely movable torque transfer member installed in the accommodation space. The circumferentially-uneven-width-space forming portion is shaped so that the torque transfer member wedges between the circumferentially-uneven-width-space forming portion and an inner peripheral surface of the rotary output shaft to transfer torque from the rotary input shaft to the rotary output shaft.

40 Claims, 5 Drawing Sheets

ONE-WAY ROTATIONAL TRANSFER MECHANISM

BACKGROUND OF THE INVENTION

1. Field of the Invention

The present invention relates to a one-way rotational transfer mechanism having a rotary input shaft and a rotary output shaft which are coaxially arranged, wherein rotation of the rotary input shaft is transferred to the rotary output shaft when the rotary input shaft is rotated, but rotation of the rotary output shaft is not transferred to the rotary input shaft when the rotary output shaft is rotated.

2. Description of the Related Art

Among conventional one-way rotational transfer mechanisms having a rotary input shaft and a hollow-cylindrical rotary output shaft positioned radially outside the rotary input shaft, wherein the rotary input shaft is driven by motor to transfer rotation of the rotary input shaft to the hollow-cylindrical rotary output shaft, a one-way rotational transfer mechanism which prevents the motor from being rotated by rotation of the rotary output shaft (i.e., prevents the rotary input shaft from being rotated by rotation of the rotary output shaft) when the rotary output shaft is rotated has been disclosed in, e.g., Japanese Unexamined Patent Publication H08-177878 and Japanese Unexamined Patent Publication H11-202181.

In the one-way rotational transfer mechanism disclosed in Japanese patent publication No. Hei-08-177878, the one-way rotational transfer mechanism does not operate smoothly and tends to be susceptible to use conditions if an appropriate viscous matter suitable for use conditions of a product incorporating the one-way rotational transfer mechanism (e.g., the operating temperature of the product) is not selected. Moreover, the structure of the one-way rotational transfer mechanism is complicated because it requires a sealing member for sealing the viscous matter.

In the one-way rotational transfer mechanism disclosed in Japanese patent publication Hei-11-202181, the structure thereof is complicated. Moreover, it is difficult to increase the number of rollers serving as torque transfer members due to the complicated structure of the one-way rotational transfer mechanism, and accordingly, the torque which is transferred from the rotary input shaft to the hollow-cylindrical rotary output shaft when the rotary input shaft is driven to rotate cannot be increased very much.

SUMMARY OF THE INVENTION

The present invention provides a one-way rotational transfer mechanism, which is simple in structure, which is less susceptible to use conditions such as operating temperature, can operate reliably and smoothly, and allows a greater transfer of torque than that of the prior art.

According to an aspect of the present invention, a one-way rotational transfer mechanism is provided, including a rotary input shaft having an orthogonal surface lying on a plane orthogonal to an axis of the rotary input shaft; a hollow-cylindrical rotary output shaft provided around the rotary input shaft to be freely rotatable relative to the rotary input shaft about the axis thereof, the hollow-cylindrical rotary output shaft having a cylindrical inner peripheral surface; a circumferentially-uneven-width-space forming portion formed on the rotary input shaft to form at least one accommodation space between the rotary input shaft and the cylindrical inner peripheral surface, the accommodation space having different radial widths at different circumferential positions; a differential rotating member installed in the accommodation space, and pressed against the orthogonal surface by a biasing device, the differential rotating member revolving around the axis of the rotary input shaft in a same direction as a rotational direction of the rotary input shaft while revolving at a slower speed than the rotation of the rotary input shaft in association with the rotation of the rotary input shaft; and at least one torque transfer member installed in the accommodation space to be freely movable therein, the torque transfer member revolving around the axis of the rotary input shaft in a same rotational direction as the differential rotating member when pressed by the differential rotating member. The circumferentially-uneven-width-space forming portion is shaped so that the torque transfer member, which rotates in a circumferential direction about the axis of the rotary input shaft, wedges between the circumferentially-uneven-width-space forming portion and the cylindrical inner peripheral surface of the hollow-cylindrical rotary output shaft in order to transfer a torque from the rotary input shaft to the hollow-cylindrical rotary output shaft when the rotary input shaft is rotated.

It is desirable for the rotary input shaft to include an input gear which is in mesh with an output gear of a reversible motor. Upon rotation of the hollow-cylindrical rotary output shaft being stopped, the reversible motor is rotated in a rotational direction opposite to a previous rotational direction thereof by an angle of rotation smaller than backlash between the input gear and the output gear to rotate the rotary input shaft in a rotational direction opposite to a previous rotational direction of the rotary input shaft without rotating the hollow-cylindrical rotary output shaft.

It is desirable for the torque transfer member to include a cylindrical member having an axis parallel to the axis of the rotary input shaft.

It is desirable for the differential rotating member to include a cylindrical member freely rotatable on an axis extending in a radial direction of the rotary input shaft.

The differential rotating member can be formed as a spherical member.

It is desirable for the biasing device to be a compression coil spring.

It is desirable for the torque transfer member to include a pair of torque transfer members which are positioned on opposite sides of associated differential rotating member along the circumferential direction in a manner so as to hold the associated differential rotating member.

The one-way rotational transfer mechanism can include a pressing member having a pressing surface which faces the orthogonal surface so as to be parallel thereto, wherein the pressing member is continuously biased toward the orthogonal surface by the biasing device to hold the differential rotating members between the pressing surface and the orthogonal surface.

It is desirable for the accommodation space to include a plurality of accommodation spaces formed between the circumferentially-uneven-width-space forming portion and the cylindrical inner peripheral surface of the hollow-cylindrical rotary output shaft, and the differential rotating member includes a plurality of differential rotating members. At least one of the differential rotating members and the torque transfer member are installed in each of the plurality of accommodation spaces.

It is desirable for the circumferentially-uneven-width-space forming portion to include a portion having a non-circular cross section which includes at least one accommodation-space forming surface for forming the accommodation space between the accommodation-space forming surface and the cylindrical inner peripheral surface of the hollow-cylindrical rotary output shaft.

It is desirable for the portion having the non-circular cross section to be regular polygonal in cross section.

In another embodiment, a one-way rotational transfer mechanism is provided, including a hollow-cylindrical rotary input shaft having an orthogonal surface lying on a plane orthogonal to an axis of the hollow-cylindrical rotary input shaft; a rotary output shaft positioned radially inside the hollow-cylindrical rotary input shaft to be freely rotatable relative to the hollow-cylindrical rotary input shaft about the axis thereof, the rotary output shaft having a cylindrical outer peripheral surface; a circumferentially-uneven-width-space forming portion formed on an inner peripheral surface of the hollow-cylindrical rotary input shaft to form at least one accommodation space between the hollow-cylindrical rotary input shaft and the cylindrical outer peripheral surface, the accommodation space having different radial widths at different circumferential positions; a differential rotating member installed in the accommodation space, and pressed against the orthogonal surface by a biasing device, the differential rotating member revolving around the axis of the hollow-cylindrical rotary input shaft in a same direction as a rotational direction of the hollow-cylindrical rotary input shaft while revolving at a slower speed than that of the rotation of the hollow-cylindrical rotary input shaft in association with the rotation of the hollow-cylindrical rotary input shaft; and at least one torque transfer member installed in the accommodation space to be freely movable therein, the torque transfer member revolving around the axis of the hollow-cylindrical rotary input shaft in a same direction as a revolving direction of the differential rotating members when pressed by the differential rotating members. The circumferentially-uneven-width-space forming portion is shaped so that the torque transfer member which-revolves in a circumferential direction about the axis of the hollow-cylindrical rotary input shaft wedges between the circumferentially-uneven-width-space forming portion and the cylindrical outer peripheral surface of the rotary output shaft to transfer a torque from the hollow-cylindrical rotary input shaft to the rotary output shaft when the hollow-cylindrical rotary input shaft is rotated.

It is desirable for the rotary input shaft to include an input gear which is in mesh with an output gear of a reversible motor. Upon rotation of the rotary output shaft being stopped, the reversible motor is rotated in a rotational direction opposite to a previous rotational direction thereof by an angle of rotation smaller than backlash between the input gear and the output gear to rotate the rotary input shaft in a rotational direction opposite to a previous rotational direction of the rotary input shaft without rotating the rotary output shaft.

It is desirable for the torque transfer member to include a cylindrical member having an axis parallel to the axis of the rotary input shaft.

It is desirable for the differential rotating member to include a cylindrical member freely rotatable on an axis extending in a radial direction of the rotary input shaft.

The differential rotating member can be formed as a spherical member.

It is desirable for the biasing device to be a compression coil spring.

It is desirable for the torque transfer member to include a pair of torque transfer members which are positioned on opposite sides of associated differential rotating member along the circumferential direction in a manner so as to hold the associated differential rotating member.

The one-way rotational transfer mechanism can include a pressing member having a pressing surface which faces the orthogonal surface so as to be parallel thereto, wherein the pressing member is continuously biased toward the orthogonal surface by the biasing device to hold the differential rotating member between the pressing surface and the orthogonal surface.

It is desirable for the accommodation space to include a plurality of accommodation spaces formed between the circumferentially-uneven-width-space forming portion and the cylindrical outer peripheral surface of the rotary output shaft, and the differential rotating member includes a plurality of differential rotating members. At least one of the differential rotating members and the torque transfer member are installed in each of the plurality of accommodation spaces.

In another embodiment, a one-way rotational transfer mechanism is provided, including a rotary input shaft having an orthogonal surface lying on a plane orthogonal to an axis of the rotary input shaft; a hollow-cylindrical rotary output shaft provided around the rotary input shaft to be freely rotatable relative to the rotary input shaft about the axis thereof, the hollow-cylindrical rotary output shaft having a cylindrical inner peripheral surface; a circumferentially-uneven-width-space forming portion formed on the rotary input shaft to form an annular space including at least one accommodation space between the rotary input shaft and the cylindrical inner peripheral surface, the accommodation space having different radial widths at different circumferential positions; a differential rotating member pressed against the orthogonal surface by a biasing device, the differential rotating member revolving around the axis of the rotary input shaft in a same direction as a rotational direction of the rotary input shaft while revolving at a slower speed than the rotation of the rotary input shaft in association with the rotation of the rotary input shaft; a retainer installed in the annular space, and rotating around the axis of the rotary input shaft in a same direction as the revolving direction of the differential rotating member when pressed by the differential rotating members; and at least one torque transfer member supported by the retainer to rotate together with the retainer in the accommodation space. The circumferentially-uneven-width-space forming portion is shaped so that the torque transfer member which rotates in a circumferential direction about the axis of the rotary input shaft wedges between an outer peripheral surface of the rotary input shaft and the cylindrical inner peripheral surface of the hollow-cylindrical rotary output shaft to transfer a torque from the rotary input shaft to the hollow-cylindrical rotary output shaft when the rotary input shaft is rotated.

It is desirable for the rotary input shaft to include an input gear which is in mesh with an output gear of a reversible motor. Upon rotation of the rotary output shaft being stopped, the reversible motor is rotated in a rotational direction opposite to a previous rotational direction thereof by an angle of rotation smaller than backlash between the input gear and the output gear to rotate the rotary input shaft in a rotational direction opposite to a previous rotational direction of the rotary input shaft without rotating the rotary output shaft.

It is desirable for the torque transfer member to include a cylindrical member having an axis parallel to the axis of the rotary input shaft.

It is desirable for the differential rotating member to include a cylindrical member freely rotatable on an axis extending in a radial direction of the rotary input shaft.

The differential rotating member can be formed as a spherical member.

It is desirable for the biasing device to be a compression coil spring.

The one-way rotational transfer mechanism can include a pressing member having a pressing surface which faces the orthogonal surface so as to be parallel thereto, wherein the pressing member is continuously biased toward the orthogonal surface by the biasing device to hold the differential rotating member between the pressing surface and the orthogonal surface.

It is desirable for the accommodation space to include a plurality of accommodation spaces formed between the circumferentially-uneven-width-space forming portion and the cylindrical inner peripheral surface of the hollow-cylindrical rotary output shaft, and for the torque transfer member to be installed in each of the plurality of accommodation spaces.

It is desirable for the circumferentially-uneven-width-space forming portion to include circumferentially-uneven-depth grooves having different radial depths at different circumferential positions.

It is desirable for the circumferentially-uneven-depth grooves to be positioned at equi-angular intervals in a circumferential direction of the rotary input shaft.

In another embodiment, a one-way rotational transfer mechanism is provided, including a hollow-cylindrical rotary input shaft having an orthogonal surface lying on a plane orthogonal to an axis of the rotary input shaft; a rotary output shaft provided around the hollow-cylindrical rotary input shaft to be freely rotatable relative to the hollow-cylindrical rotary input shaft about the axis thereof, the rotary output shaft having a cylindrical outer peripheral surface; a circumferentially-uneven-width-space forming portion formed on the hollow-cylindrical rotary input shaft to form an annular space including at least one accommodation space between the hollow-cylindrical rotary input shaft and the cylindrical outer peripheral surface, the accommodation space having different radial widths at different circumferential positions; a differential rotating member pressed against the orthogonal surface by a biasing device, the differential rotating member revolving around the axis of the hollow-cylindrical rotary input shaft in a same direction as a rotational direction of the hollow-cylindrical rotary input shaft while revolving at a slower speed than rotation of the hollow-cylindrical rotary input shaft in association with the rotation of the hollow-cylindrical rotary input shaft; a retainer installed in the annular space, and rotating around the axis of the hollow-cylindrical rotary input shaft in a same rotational direction as the differential rotating member when pressed by the differential rotating member; and at least one torque transfer member supported by the retainer to rotate together with the retainer in the accommodation space. The circumferentially-uneven-width-space forming portion is shaped so that the torque transfer member which rotates in a circumferential direction about the axis of the hollow-cylindrical rotary input shaft wedges between an inner peripheral surface of the hollow-cylindrical rotary input shaft and the cylindrical outer peripheral surface of the rotary output shaft to transfer a torque from the hollow-cylindrical rotary input shaft to the rotary output shaft when the hollow-cylindrical rotary input shaft is driven to rotate.

It is desirable for the rotary input shaft to include an input gear which is in mesh with an output gear of a reversible motor. Upon rotation of the rotary output shaft being stopped, the reversible motor is rotated in a rotational direction opposite to a previous rotational direction thereof by an angle of rotation smaller than backlash between the input gear and the output gear to rotate the rotary input shaft in a rotational direction opposite to a previous rotational direction of the rotary input shaft without rotating the rotary output shaft.

It is desirable for the torque transfer member to include a cylindrical member having an axis parallel to the axis of the rotary input shaft.

It is desirable for the differential rotating member to include a cylindrical member freely rotatable on an axis extending in a radial direction of the rotary input shaft.

The differential rotating member can be formed as a spherical member.

It is desirable for the biasing device to be a compression coil spring.

The one-way rotational transfer mechanism can include a pressing member having a pressing surface which faces the orthogonal surface so as to be parallel thereto, wherein the pressing member is continuously biased toward the orthogonal surface by the biasing device to hold the differential rotating member between the pressing surface and the orthogonal surface.

It is desirable for each of the differential rotating members to be formed as a spherical member the accommodation space to include a plurality of accommodation spaces formed between the circumferentially-uneven-width-space forming portion and the cylindrical outer peripheral surface of the rotary output shaft, and for the torque transfer member is installed in each of the plurality of accommodation spaces.

It is desirable for the circumferentially-uneven-width-space forming portion to include circumferentially-uneven-depth grooves having different radial depths at different circumferential positions.

It is desirable for each of the differential rotating members to be formed as a spherical member the circumferentially-uneven-depth grooves to be positioned at equi-angular intervals in a circumferential direction of the hollow-cylindrical rotary input shaft.

The present disclosure relates to subject matter contained in Japanese Patent Application No. 2003-344808 (filed on Oct. 2, 2003) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
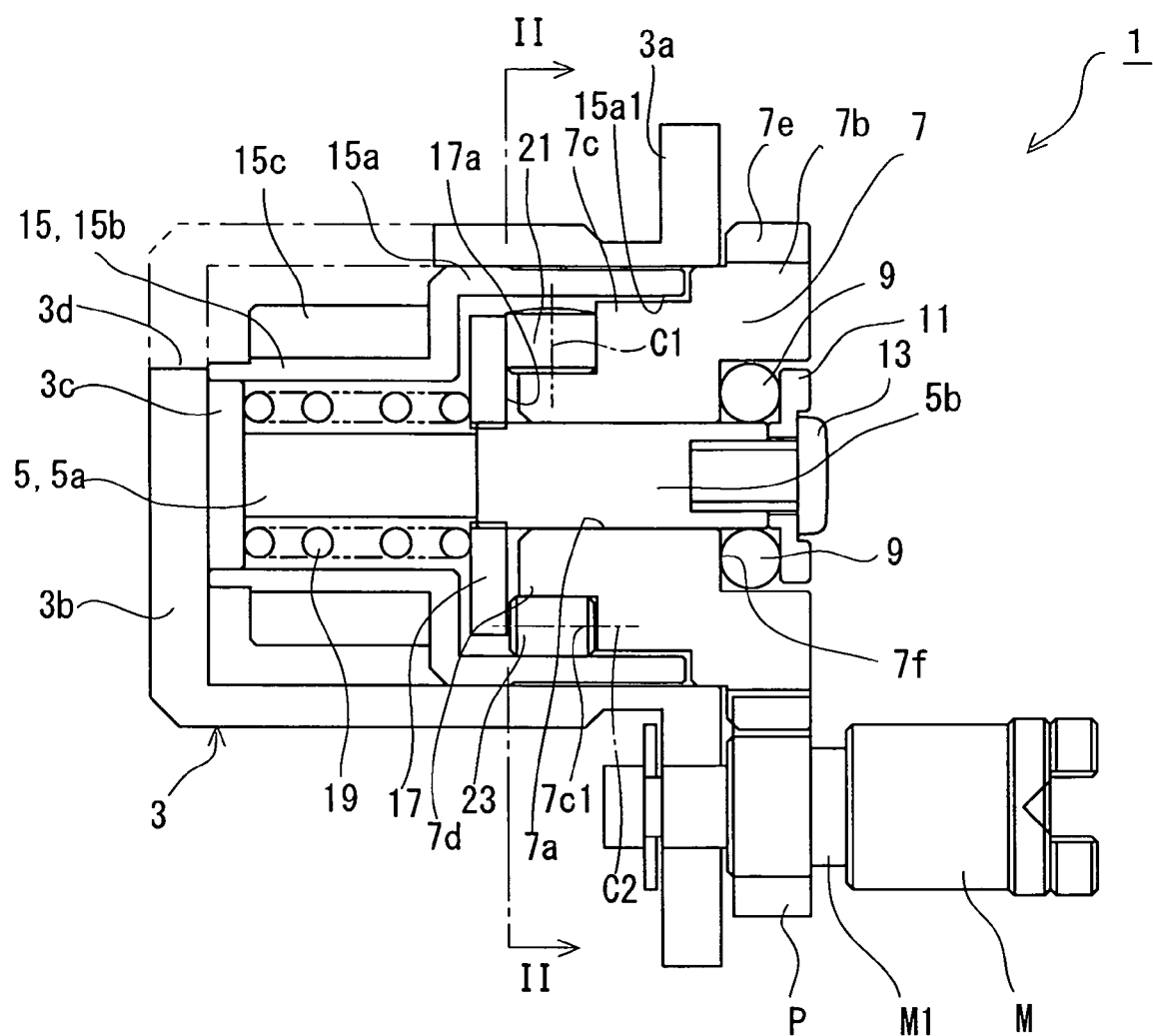
FIG. 1 is a longitudinal cross sectional view of a first embodiment of a one-way rotational transfer mechanism according to the present invention.
Figure 2:
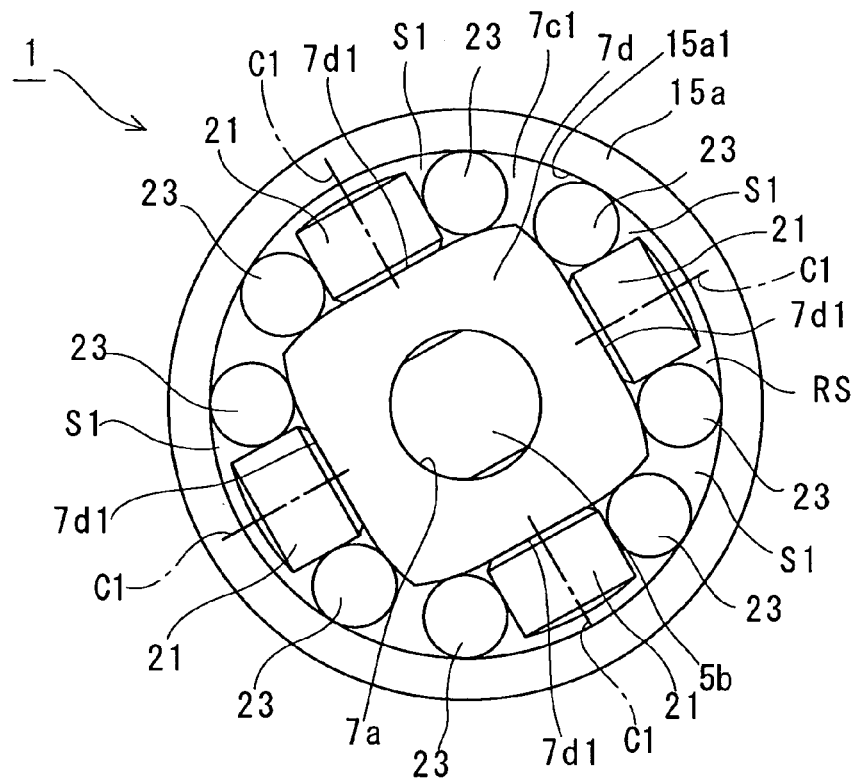
FIG. 2 is a cross sectional view taken along II—II line shown in FIG. 1.

FIGS. 1 and 2 show a first embodiment of the one-way rotational transfer mechanism according to the present invention. This embodiment of the one-way rotational transfer mechanism 1 is incorporated in an autofocus camera in which a photographing mode can be selected between an autofocus mode (AF mode) and a manual focus mode (MF mode). Firstly, the structure of the one-way rotational transfer mechanism 1 will be discussed hereinafter.

In the following descriptions, the front and rear of the one-way rotational transfer mechanism 1 correspond to left and right sides in FIG. 1, respectively. The one-way rotational transfer mechanism 1 is provided with a cylindrical housing 3 whose front and rear ends are formed as a closed end and an open end, respectively. The cylindrical housing 3 is provided at a rear end thereof with an annular flange 3a which is fixed to a camera body (not shown) by set screws (not shown) to be positioned inside the camera body. The cylindrical housing 3 is provided at a front end thereof with a front wall 3b, and a disc plate 3c is fixed to a rear surface of the front wall 3b at the center thereof. The one-way rotational transfer mechanism 1 is provided radially inside the housing 3 with a rotational shaft (stationary shaft) 5 which is positioned coaxially with the axis of the housing 3. A front surface of the rotational shaft 5 is fixed to a rear surface of the disc plate 3c. The rotational shaft 5 consists of a front small-diameter portion 5a and a rear large-diameter portion 5b. In a state where the one-way rotational transfer mechanism 1 is incorporated in a camera, the axial direction of the rotational shaft 5 is parallel to a photographing optical axis of an interchangeable lens of the camera.

The one-way rotational transfer mechanism 1 is provided on the large-diameter portion 5b of the rotational shaft 5 with a hollow-cylindrical rotary input shaft 7 having a central hole 7a so that the cylindrical rotary input shaft 7 is freely rotatable on the large-diameter portion 5b of the rotational shaft 5. As shown in FIG. 1, the rotary input shaft 7 is formed so that a diameter thereof increases in three steps in a direction toward the rear of the rotary input shaft 7. Specifically, the rotary input shaft 7 is provided with a large-diameter portion 7b, an intermediate-diameter portion 7c and a small-diameter portion (portion having a non-circular cross section) 7d in that order from the rear end to the front end of the rotary input shaft 7, so that a front surface of the intermediate-diameter portion 7c is formed as an axially-orthogonal surface 7c1 (viewed as an annular surface from the front of the rotary input shaft 7) which lies in a plane orthogonal to the axis of the rotary input shaft 7 (rotational shaft 5). The small-diameter portion 7d serves as a circumferentially-uneven-width-space forming portion. Each of the large-diameter portion 7b and the intermediate-diameter portion 7c has a circular cross section, whereas the small-diameter portion 7d has a substantially square cross section as shown in FIG. 2. The large-diameter portion 7b is provided on an outer peripheral surface thereof with an input gear 7e.

A front portion of the rotary input shaft 7 in front of the input gear 7e is accommodated in the housing 3. The rotary input shaft 7 is provided, on a rear end surface thereof at the center of this rear end surface, with an annular recess 7f, while a plurality of steel balls 9 for ball bearing are positioned circumferentially in the annular recess 7f. A stop ring 11 having a diameter substantially the same as the diameter of the annular recess 7f is fixed to the rear end surface of the rotational shaft 5 by a set screw 13 to prevent the rotary input shaft 7 from moving rearward beyond the position thereof shown in FIG. 1 by engagement of each steel ball 9 with the stop ring 11.

An AF motor (reversible motor) M is fixed to the annular flange 3a of the housing 3 so that a pinion (output gear) P fixed on a rotary shaft M1 of the AF motor M is in mesh with the input gear 7e of the rotary input shaft 7.

The one-way rotational transfer mechanism 1 is provided inside the housing 3 with a hollow-cylindrical rotary output shaft 15 whose front and rear ends are each formed as an open end. The rotary output shaft 15 is rotatable about the rotational shaft 5. The rotary output shaft 15 is formed so that a diameter thereof increases in two steps in a direction toward the rear of the rotary output shaft 15. Specifically, the rotary output shaft 15 is provided with a large-diameter portion 15a and a small-diameter portion 15b, in that order from the rear end to the front end of the rotary output shaft 15. A rear end portion of the large-diameter portion 15a is fitted in the annular space formed between an inner peripheral surface of the housing 3 and an outer peripheral surface of the intermediate-diameter portion 7c of the rotary input shaft 7 so that the large-diameter portion 15a is rotatable about the rotational shaft 5, while a front end portion of the small-diameter portion 15b is fitted on an outer peripheral surface of the disc plate 3c so that the small-diameter portion 15b is rotatable on the disc plate 3c. The small-diameter portion 15b is provided on its entire outer peripheral surface with an output gear 15c which is exposed to the outside of the housing 3 via an opening 3d formed on a front end portion of the housing 3. Upon an interchangeable lens (not shown) being mounted to a camera body of the camera incorporating the one-way rotational transfer mechanism 1, an input gear of a focusing mechanism provided in the interchangeable lens is engaged with the output gear 15c through the opening 3d of the housing 3.

An annular member (pressing member) 17 is fitted on the rear large-diameter portion 5b of the rotational shaft 5 to be positioned in front of the rotary input shaft 7. A compression coil spring (biasing device) 19 is installed in a compressed state between a front surface of the annular member 17 and a rear surface of the disc plate 3c. The annular member 17 is continuously biased rearward by the spring force of the compression coil spring 19.

As shown in FIG. 2, an accommodation space (circumferentially-uneven-width space) S1 having different radial widths at different circumferential positions is formed between an inner peripheral surface (cylindrical surface) 15a1 of the large-diameter portion 15a and each of four side surfaces (accommodation-space forming surfaces) 7d1 of the small-diameter portion 7d. In other words, an annular space RS which is formed between the small-diameter portion 7d and the inner peripheral surface 15a1 of the large-diameter portion 15a, as viewed from the front of the one-way rotational transfer mechanism 1, is divided into four to form the four accommodation spaces S1.

A differential roller (differential rotating member) 21 having a substantially columnar shape is installed in each of the four accommodation spaces S1 so that an axis C1 of the differential roller 21 extends in a radial direction of the rotary input shaft 7. Each differential roller 21 is loosely fitted in between the associated side surface 7*d*1 and the inner peripheral surface 15*a*1, while the axially-orthogonal surface 7*c*1 of the rotary input shaft 7 and a pressing surface 17*a*, which lies on a plane orthogonal to the axis of the rotational shaft 5, serving as a rear surface of the annular member 17 are in contact with peripheral surfaces of each differential roller 21 at opposite sides thereof so that the differential roller 21 is held between the axially-orthogonal surface 7*c*1 and the pressing surface 17*a*.

Additionally, a pair of engageable rollers (torque transfer members) 23 are installed in each accommodation space S1 on opposite sides of the associated differential roller 21 as viewed from the front of the one-way rotational transfer mechanism 1 in a manner so as to hold the differential roller 21 between the pair of engageable rollers 23. Each engageable roller 23 has a substantially columnar shape, and an axis C2 of each engageable roller 23 extends in a direction parallel to the axis of the rotational shaft 5. Each engageable roller 23 is movable in the associated accommodation space S1 in a circumferential direction about the axis of the rotational shaft 5. In addition, each engageable roller 23 is movable in the direction of the axis C2 with respect to the annular member 17 and the rotary input shaft 7 because the length of each engageable roller 23 in the direction of the axis C2 thereof is shorter than the diameter of each differential roller 21 about the axis C1 and because each engageable roller 23 does not undergo any biasing force from the annular member 17.

Operations of the one-way rotational transfer mechanism 1 having the above described structure will be discussed hereinafter.

Firstly, operations of the one-way rotational transfer mechanism 1 when a focusing operation is performed in autofocus mode will be hereinafter discussed.

Immediately after a control circuit (not shown) provided in the camera body outputs a forward-rotation drive signal to the AF motor M to rotate the AF motor M in a forward direction, a forward rotation of the AF motor M is transferred to the rotary input shaft 7 via the engagement of the pinion P with the input gear 7*e*, so that the rotary input shaft 7 rotates counterclockwise as viewed in FIG. 2. Thereupon, each differential roller 21 that is held between the pressing surface 17*a* of the annular member 17 and the axially-orthogonal surface 7*c*1 of the rotary input shaft 7 revolves (rotates) around the axis of the rotary input shaft 7 in the same rotational direction (counterclockwise direction) as the rotary input shaft 7 while rotating about the axis C1 of the differential roller 21 in the associated accommodation space S1. During this movement of each differential roller 21, provided that no slip occurs either between each differential roller 21 and the pressing surface 17*a* or between each differential roller 21 and the axially-orthogonal surface 7*c*1, the rotational speed of each differential roller 21 around the axis of the rotary input shaft 7 is half the rotational speed of the rotary input shaft 7. As a result, each differential roller 21 rotates clockwise relative to the rotary input shaft 7. Therefore, each differential roller 21 comes in contact with one of the associated pair of engageable rollers 23 which is positioned on the clockwise side, and subsequently biases this engageable roller 23 so that it rotates clockwise. This engageable roller 23 rotates clockwise in the associated accommodation space S1 to firmly wedge into one of the wedge-shaped (radially-narrowed) circumferentially opposite end portions of the associated accommodation space S1 which is positioned on the clockwise side in the accommodation space S1 between the associated side surface 7*d*1 of the small-diameter portion 7*d* and the inner peripheral surface 15*a*1 of the large-diameter portion 15*a*. This causes the small-diameter portion 7*d* (the rotary input shaft 7) and the rotary output shaft 15 to become integral with each other circumferentially via the wedged engageable rollers 23 so that the rotation of the small-diameter portion 7*d* is transferred to the rotary output shaft 15 to rotate the rotary output shaft 15 counterclockwise. Thereupon, this rotation of the rotary output shaft 15 is transferred to the aforementioned focusing mechanism, which is provided in the interchangeable lens, via the output gear 15*c* to move a focusing lens group (not shown) forward along the photographing optical axis.

On the other hand, if the control circuit in the camera body outputs a reverse-rotation drive signal to the AF motor M to rotate the AF motor M in reverse direction, a reverse rotation of the AF motor M is transferred to the rotary input shaft 7 via the engagement of the pinion P with the input gear 7*e*, so that the rotary input shaft 7 rotates clockwise as viewed in FIG. 2. Thereupon, each differential roller 21 revolves (rotates) around the axis of the rotary input shaft 7 in the same rotational direction (clockwise direction) as the rotary input shaft 7 at a rotational speed half the rotational speed of the rotary input shaft 7 while rotating on the axis C1 of the differential roller 21. As a result, each differential roller 21 rotates counterclockwise relative to the rotary input shaft 7. Therefore, each differential roller 21 comes in contact with the other of the associated pair of engageable rollers 23 that is positioned on the counterclockwise side, and subsequently biases this engageable roller 23 so that it rotates counterclockwise. This engageable roller 23 rotates counterclockwise in the associated accommodation space S1 to firmly wedge into the other of the wedge-shaped (radially-narrowed) circumferentially opposite end portions of the associated accommodation space S1, which is positioned on the counterclockwise side in associated accommodation space S1 between the associated side surface 7*d*1 of the small-diameter portion 7*d* and the inner peripheral surface 15*a*1 of the large-diameter portion 15*a*. This causes the small-diameter portion 7*d* (the rotary input shaft 7) and the rotary output shaft 15 to become integral with each other circumferentially via the wedged engageable rollers 23, so that the rotation of the small-diameter portion 7*d* is transferred to the rotary output shaft 15 to rotate the rotary output shaft 15 clockwise. Thereupon, this rotation of the rotary output shaft 15 is transferred to the aforementioned focusing mechanism provided in the interchangeable lens to move the focusing lens group rearward along the photographing optical axis.

In this manner the control circuit makes the AF motor M rotate in forward and reverse directions to move the focusing lens forward and rearward to perform an autofocusing operation.

Immediately after an in-focus state is obtained by the autofocusing operation, the control circuit sends a control signal to the AF motor M to rotate the AF motor M in a rotational direction opposite to the previous rotational direction of the AF motor M by an angle of rotation smaller than backlash between the pinion P and the input gear 7*e*. Thereupon, the rotary input shaft 7 rotates in a rotational direction opposite to the previous rotational direction, in which the rotary input shaft 7 rotates immediately before the aforementioned in-focus state is obtained, without rotating the rotary output shaft 15 to thereby reduce the contacting force of each engageable roller 23 with each of the associated side surface 7*d*1 of the small-diameter portion 7*d* and the inner peripheral surface 15*a*1 of the large-diameter portion 15a. This reduction of such a contacting force allows a manual focus ring (not shown) of the interchangeable lens to be rotated smoothly.

Operations of the one-way rotational transfer mechanism 1 when a focusing operation is performed in manual focus mode will be hereinafter discussed.

In a state shown in FIG. 2, if the manual focus ring of the interchangeable lens is manually rotated in a forward or reverse rotational direction with no actuation of the AF motor M, this forward or reverse rotation of the manual focus ring is transferred to the focusing mechanism provided in the interchangeable lens to perform a focusing operation (MF operation).

Immediately after the rotation of the manual focus ring is transferred to the focusing mechanism, rotational force is transferred from the focusing ring to the output gear 15c of the rotary output shaft 15. Thereafter, the rotary output shaft 15 rotates clockwise or counterclockwise about the rotational shaft 5, whereas no rotation is transferred from the rotary output shaft 15 to either each engageable roller 23 or each differential roller 21 since the inner peripheral surface (cylindrical surface) 15a1 of the rotary output shaft 15 has a circular shape as viewed from the front of the one-way rotational transfer mechanism 1. Therefore, rotation of the rotary output shaft 15 does not cause the small-diameter portion 7d (the rotary input shaft 7) to rotate, thus applying no load on the AF motor M.

As can be understood from the above descriptions, according to the present embodiment of the one-way rotational transfer mechanism, the one-way rotational transfer mechanism 1 having a simple structure in which the rotary output shaft 15 rotates when the rotary input shaft 7 is rotated and in which the rotary input shaft 7 does not rotate when the rotary output shaft 15 is rotated is achieved.

In addition, the one-way rotational transfer mechanism 1 is less subject to use conditions of the camera (e.g., the operating temperature of the camera at a picture taking), and operates smoothly even if such use conditions vary.

Additionally, if an one-way rotational transfer mechanism according to the present invention is applied between a camera body incorporating an AF motor and an interchangeable lens having a manual focus ring in a manner similar to that in the above illustrated embodiment of the one-way rotational transfer mechanism, a photographing state can be switched between AF mode and MF mode without the need for any switch for switching a photographing state between AF mode and MF mode.

A torque can be reliably transferred from the rotary input shaft 7 to the rotary output shaft 15 because each differential roller 21 is made to revolve (rotate) around the rotary input shaft 7 in the same rotational direction as the rotary input shaft 7 while trailing behind the rotation of the rotary input shaft 7, and subsequently, because each engageable roller 23 is made to wedge firmly between the associated side surface 7d1 of the small-diameter portion 7d and the inner peripheral surface 15a1 of the large-diameter portion 15a to serve as a torque transfer member.

Moreover, since each engageable roller 23 is formed as a cylindrical member, the axis C2 of which is parallel to the axis of the rotational shaft 5, each engageable roller 23 that serves as a torque transfer member is in contact with each of the rotary input shaft 7 and the rotary output shaft 15 on a contact area greater than that in the case where the torque transfer member is formed in a spherical member. Therefore, the efficiency of transferring torque from the rotary input shaft 7 to the rotary output shaft 15 in the present embodiment of the one-way rotational transfer mechanism 1 is higher than that in the case where each torque transfer member is formed in a spherical member.

The number of the differential rollers 21 or the engageable rollers 23 which are accommodated in each accommodation space S1 can be changed by changing a cross sectional shape of the small-diameter portion 7d to a regular polygonal shape other than a square shape such as a regular triangular shape or a regular pentagonal shape, or by forming the small-diameter portion 7d to have a non-circular cross section so as to include at least one circumferentially-uneven-width-space forming portion (portion having a non-circular cross section) for forming at least one accommodation space (accommodation space S1 having different radial widths at different circumferential positions) between the inner peripheral surface (cylindrical surface) 15a1 of the rotary output shaft 15 and the small-diameter portion 7d. With a change in the number of the differential rollers 21 or the engageable rollers 23, the efficiency of transferring torque from the rotary input shaft 7 to the rotary output shaft 15 can be adjusted.

Figure 3:
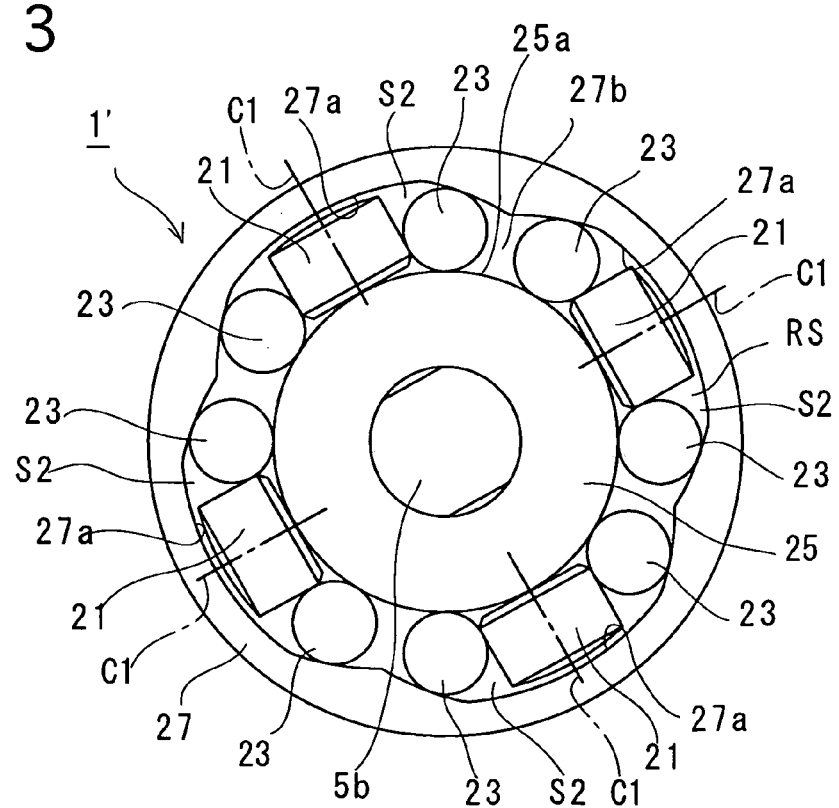
FIG. 3 is a view similar to that of FIG. 2, showing a modification of the first embodiment of the one-way rotational transfer mechanism.

FIG. 3 shows a modification of the first embodiment of the one-way rotational transfer mechanism, in which a rotary input shaft and a rotary output shaft are positioned in a radially reversed fashion; namely, a rotary input shaft 27 is positioned radially outside a hollow-cylindrical rotary output shaft 25.

In the one-way rotational transfer mechanism 1' shown in FIG. 3, the rotary output shaft 25 is rotatably fitted on the large-diameter portion 5b of the rotational shaft 5, while the hollow-cylindrical rotary input shaft 27 is positioned radially outside the rotary output shaft 25 to be rotatable about the axis of the rotational shaft 5. The rotary input shaft 27 is provided, on an inner peripheral surface thereof at equiangular intervals in a circumferential direction of the rotary input shaft 27, with four circumferentially-uneven-depth grooves (circumferentially-uneven-width-space forming portions) 27a which have different radial depths at different circumferential positions. The one-way rotational transfer mechanism 1' is provided between each circumferentially-uneven-depth groove 27a and an outer peripheral surface (cylindrical surface) 25a of the rotary output shaft 25 with an accommodation space (circumferentially-uneven-width space) S2 having different radial widths at different circumferential positions. In other words, an annular space RS which is formed between the rotary output shaft 25 and the rotary input shaft 27 is divided into four to form the four accommodation spaces S2.

The rotary input shaft 27 is provided with an axially-orthogonal surface 27b which lies in a plane orthogonal to the axis of the rotational shaft 5. The annular member 17 that is continuously biased rearward by the spring force of the compression coil spring 19 is fitted on the rear large-diameter portion 5b to be positioned in front of the four accommodation spaces S2 (neither the annular member nor the compression coil spring 19 is shown in FIG. 3). As shown in FIG. 3, a differential roller 21 is installed in each of the four accommodation spaces S2 to be held between the pressing surface 17a of the annular member 17 and the axially-orthogonal surface 27b of the rotary input shaft 27 at all times. Additionally, a pair of engageable rollers 23 are installed in each accommodation space S2 on opposite sides of the associated differential roller 21 to be movable in the associated accommodation space S2 in a circumferential direction about the axis of the rotational shaft 5 while holding the differential roller 21 between the pair of engageable rollers 23.

The rotary input shaft 27 is provided with an input gear (not shown) which is in mesh with the pinion P of the AF motor M, while the rotary output shaft 25 is provided with an output gear (not shown) which is in mesh with the aforementioned input gear of the focusing mechanism provided in the interchangeable lens.

Immediately after the control circuit in the camera body outputs a forward-rotation drive signal or a reverse-rotation drive signal to the AF motor M to rotate the AF motor M in forward or reverse direction, the rotary input shaft 27 rotates clockwise or counterclockwise as viewed in FIG. 3. Thereupon, each differential roller 21 revolves (rotates) around the axis of the rotary input shaft 27 in the same rotational direction as the rotary input shaft 27 at a rotational speed half the rotational speed of the rotary input shaft 27 while rotating on the axis C1 of the differential roller 21 in the associated accommodation space S1 to press one of the associated pair of engageable rollers 23 clockwise or counterclockwise which is positioned on the side opposite to the rotational direction of the rotary input shaft 27. This engageable roller 23 which is pressed to rotate clockwise or counterclockwise rotates in the associated accommodation space S2 to firmly wedge into one of the wedge-shaped (radially-narrowed) circumferentially opposite end portions of the associated accommodation space S2 between the associated circumferentially-uneven-depth groove 27a of the rotary input shaft 27 and the outer peripheral surface 25a of the rotary output shaft 25. As a result, the rotation of the rotary input shaft 27 is transferred to the rotary output shaft 25 via each engageable roller 23 to rotate the rotary output shaft 25 in the same rotational direction as the rotary input shaft 27 to perform an autofocusing operation.

Similar to the above described first embodiment of the one-way rotational transfer mechanism, immediately after an in-focus state is obtained by the autofocusing operation, the control circuit sends a control signal to the AF motor M to rotate the AF motor M in a rotational direction opposite to the previous rotational direction of the AF motor M for the autofocusing operation by an angle of rotation smaller than backlash between the pinion P and the input gear of the rotary input shaft 27 in the modification of the first embodiment of the one-way rotational transfer mechanism shown in FIG. 3. Thereupon, the rotary input shaft 27 rotates in a rotational direction opposite to the previous rotational direction, in which the rotary input shaft 27 rotates immediately before the aforementioned in-focus state is obtained, without rotating the rotary output shaft 25 to thereby reduce the contacting force of each engageable roller 23 with each of the rotary input shaft 27 and the rotary output shaft 25. This reduction of such a contacting force allows the manual focus ring of the interchangeable lens to be rotated smoothly.

In a state shown in FIG. 3, rotating the manual focus ring of the interchangeable lens causes the rotary output shaft 25 to rotate clockwise or counterclockwise. However, this rotation of the rotary output shaft 25 is not transferred to any of the engageable rollers 23 since the outer peripheral surface 25a of the rotary output shaft 25 has a circular shape as viewed from the front of the one-way rotational transfer mechanism 1', so that rotating the manual focus ring of the interchangeable lens does not cause the rotary input shaft 27 to rotate.

Accordingly, effects similar to those obtained in the first embodiment of the one-way rotational transfer mechanism can be obtained in the modification of the first embodiment of the one-way rotational transfer mechanism shown in FIG. 3.

Figure 4:
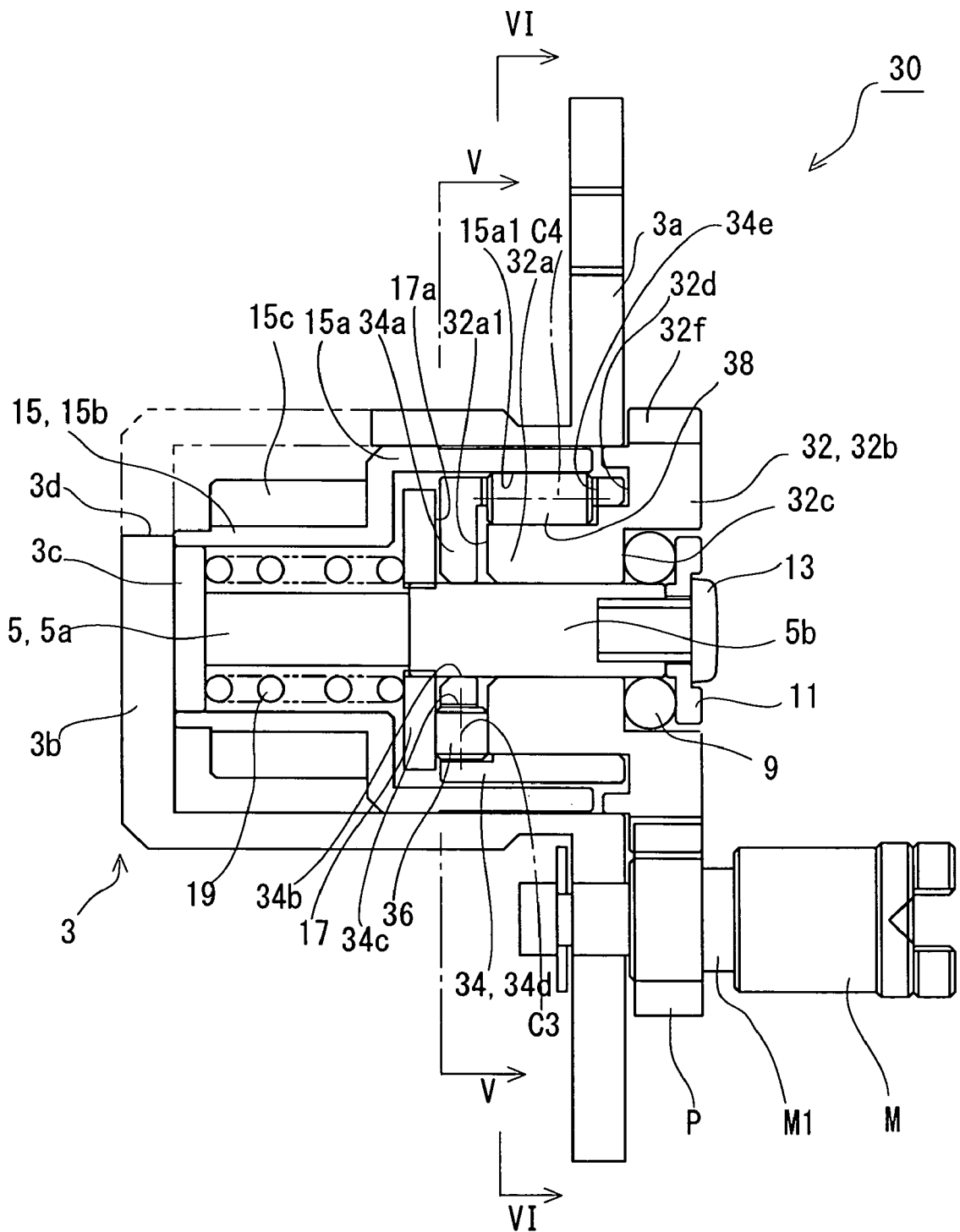
FIG. 4 is a longitudinal cross sectional view of a second embodiment of the one-way rotational transfer mechanism according to the present invention.
Figure 5:
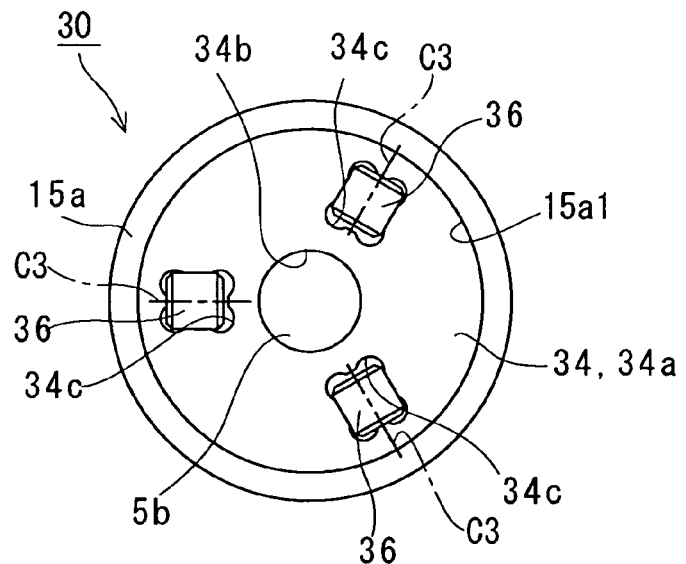
FIG. 5 is a cross sectional view taken along V—V line shown in FIG. 4.
Figure 6:
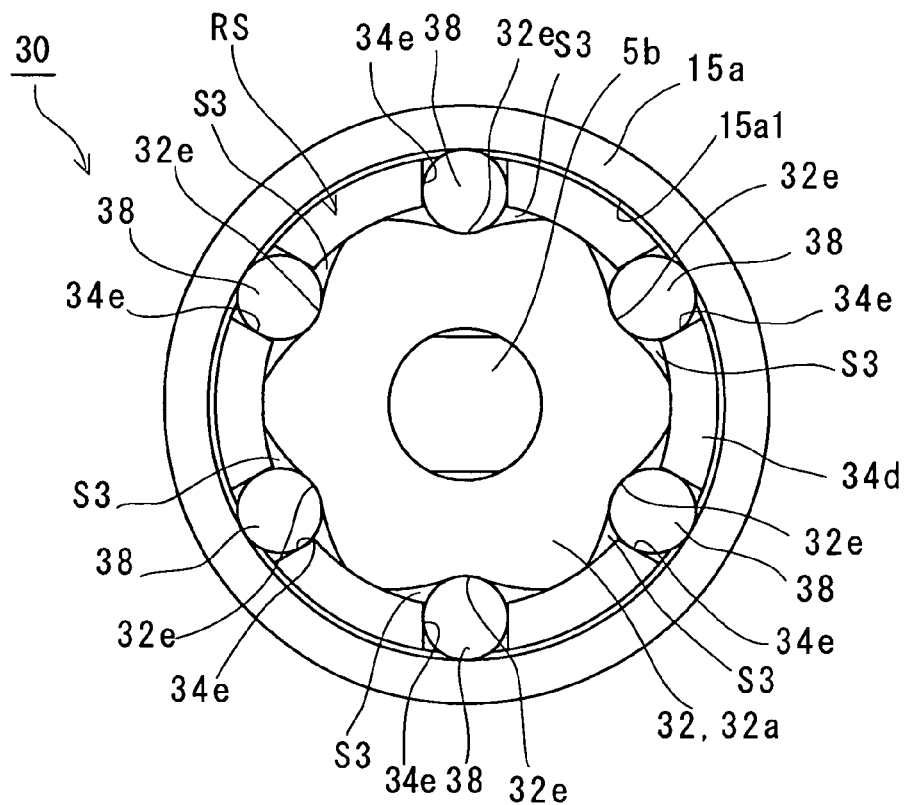
FIG. 6 is a cross sectional view taken along VI—VI line shown in FIG. 4.

FIGS. 4 through 6 show a second embodiment of the one-way rotational transfer mechanism according to the present invention. Elements and portions of this embodiment of the one-way rotational transfer mechanism which are similar to those of the first embodiment of the one-way rotational transfer mechanism are designated by the same reference numerals, and detailed descriptions of such similar elements and portions are omitted from the following descriptions.

The one-way rotational transfer mechanism 30 is provided on the large-diameter portion 5b of the rotational shaft 5 with a hollow-cylindrical rotary input shaft 32 having a small-diameter portion 32a at the front and a large-diameter portion 32b at the rear. The rotary input shaft 32 is provided on a rear surface of the large-diameter portion 32b with an annular recess 32c, and is further provided on an annular front surface of the large-diameter portion 32b with an annular engaging recess 32d (seen as an annular recess as viewed from the front of the rotary input shaft 32).

The large-diameter portion 32b of the rotary input shaft 32 is circular in cross section, while the small-diameter portion 32a of the rotary input shaft 32 is provided, on an outer peripheral surface thereof at equi-angular intervals in a circumferential direction of the rotary input shaft 32, with six circumferentially-uneven-depth grooves (circumferentially-uneven-width-space forming portions) 32e which have different radial depths at different circumferential positions (see FIG. 6). The one-way rotational transfer mechanism 30 is provided between each circumferentially-uneven-depth groove 32e and an inner peripheral surface (cylindrical surface) 15a1 of the large-diameter portion 15a of the rotary output shaft 15 with an accommodation space (circumferentially-uneven-width space) S3 having different radial widths at different circumferential positions. In other words, an annular space RS which is formed between the rotary output shaft 15 and the rotary input shaft 32 is divided into six to form the six accommodation spaces S3. The rotary input shaft 32 is provided on an outer peripheral surface of the large-diameter portion 32b with an input gear 32f which is in mesh with the pinion P.

The one-way rotational transfer mechanism 30 is provided in the rotary output shaft 15 with a retainer 34. The rear end of the retainer 34 is formed as an open end. The retainer 34 is provided at a center of a front wall 34a of the retainer 34 with an insertion hole 34b in which the rotational shaft 5 is inserted. As shown in FIG. 5, the retainer 34 is provided, on the front wall 34a thereof at equi-angular intervals in a circumferential direction., with three fitting holes 34c. A differential roller (differential rotating member) 36 having a substantially columnar shape is installed in each of the three fitting holes 34c so that the differential roller 36 is rotatable about an axis C3 thereof which extends in a radial direction of the rotary output shaft 15. The periphery of each differential roller 36 partly projects forward from a front surface of the front wall 34a of the retainer 34, and partly projects rearward from a rear surface of the front wall 34a of the retainer 34. As shown in FIG. 4, each differential roller 36 is held between the pressing surface 17a of the annular member 17 and an axially-orthogonal surface 32a1, which lies on a plane orthogonal to the axis of the rotary input shaft 32 (and rotational shaft 5) and is formed on a front surface of the rotary input shaft 32, since a front portion and a rear portion of the peripheral surface of each differential roller 36 are in contact with the pressing surface 17a of the annular member 17 and the annular surface 32a1 of the rotary input shaft 32, respectively.

As shown in FIG. 6, a cylindrical portion 34d of the retainer 34 is positioned in the annular space RS that is formed between the large-diameter portion 15a of the rotary output shaft 15 and the small-diameter portion 32a of the rotary input shaft 32. The cylindrical portion 34d is provided at equi-angular intervals in a circumferential direction with six insertion holes 34e. An engageable roller (torque transfer member) 38 is installed in each insertion hole 34e with an axis C4 of the engageable roller 38 extending parallel to the axis of the rotational shaft 5, and each engageable roller 38 is rotatable on the axis C4 thereof and linearly movable along the axis C4 thereof.

Operations of the one-way rotational transfer mechanism 30 having the above described structure will be discussed hereinafter.

Immediately after the control circuit that is provided in the camera body outputs a forward-rotation drive signal to the AF motor M to rotate the AF motor M in forward direction, a forward rotation of the AF motor M is transferred to the rotary input shaft 32 via the engagement of the pinion P with the input gear 32f, so that the rotary input shaft 32 rotates counterclockwise as viewed in FIG. 6. Thereupon, each differential roller 36 that is held between the pressing surface 17a of the annular member 17 and the axially-orthogonal surface 32a1 of the rotary input shaft 32 revolves (rotates) around the axis of the rotary input shaft 32 in the same rotational direction (counterclockwise direction) as the rotary input shaft 32 at a rotational speed half the rotational speed of the rotary input shaft 32 while rotating on the axis C3 of the differential roller 36, and accordingly the retainer 34 and each engageable roller 38 also revolve (rotate) around the axis of the rotary input shaft 32 at the same rotational speed as the differential roller 36. As a result, each differential roller 38 firmly wedges into that one of the wedge-shape (radially-narrowed) circumferentially opposite end portions of the associated accommodation space S3 which is positioned on the clockwise side in the accommodation space S3 between one of the opposite end portions of the associated circumferentially-uneven-depth groove 32e which is positioned on the clockwise side and the inner peripheral surface 15a1 of the large-diameter portion 15a. This causes the small-diameter portion 32a (the rotary input shaft 32) and the rotary output shaft 15 to become integral with each other circumferentially via the six engageable rollers 38, the retainer 34 and the three differential rollers 36, so that the rotation of the small-diameter portion 32a is transferred to the rotary output shaft 15 to rotate the rotary output shaft 15 counterclockwise. Thereupon, this rotation of the rotary output shaft 15 is transferred to the aforementioned focusing mechanism, which is provided in the interchangeable lens, via the output gear 15c to move a focusing lens group (not shown) forward along the photographing optical axis.

On the other hand, if the control circuit in the camera body outputs a reverse-rotation drive signal to the AF motor M to rotate the AF motor M in reverse direction, a reverse rotation of the AF motor M is transferred to the rotary input shaft 32 via the engagement of the pinion P with the input gear 32f, so that the rotary input shaft 32 rotates clockwise as viewed in FIG. 6. Thereupon, each differential roller 36 revolves (rotates) around the axis of the rotary input shaft 32 in the same rotational direction (clockwise direction) as the rotary input shaft 32 at a rotational speed half the rotational speed of the rotary input shaft 32, while each engageable 38 and the retainer 34 also revolve (rotate) clockwise around the axis of the rotary input shaft 32 at a rotational speed the same as the rotational speed of each differential roller 36. As a result, each engageable roller 38 rotates counterclockwise in the associated accommodation space S3 to wedge into the other of the wedge-shape (radially-narrowed) circumferentially opposite end portions of the associated accommodation space S3, which is positioned on the counterclockwise side in the accommodation space S3 between the other of the opposite end portions of the associated circumferentially-uneven-depth groove 32e, positioned on the counterclockwise side and the inner peripheral surface 15a1 of the large-diameter portion 15a. This causes the small-diameter portion 32a (the rotary input shaft 32) and the rotary output shaft 15 to become circumferentially integral with each other via the six engageable rollers 38, the retainer 34 and the three differential rollers 36, thus causing the rotary output shaft 15 to rotate clockwise to thereby move the focusing lens group rearward along the photographing optical axis.

In this manner, the control circuit makes the AF motor M rotate in forward and reverse directions to move the focusing lens forward and rearward to perform an autofocusing operation.

Similar to the first embodiment of the one-way rotational transfer mechanism, immediately after an in-focus state is obtained by the autofocusing operation, the control circuit sends a control signal to the AF motor M to rotate the AF motor M in a rotational direction opposite to the previous rotational direction of the AF motor M for the autofocusing operation by an angle of rotation smaller than backlash between the pinion P and the input gear 32f. Thereupon, the rotary input shaft 32 rotates in a rotational direction opposite to the previous rotational direction, in which the rotary input shaft 32 rotated immediately before the aforementioned in-focus state is obtained, without rotating the rotary output shaft 15 to thereby reduce the contacting force of each engageable roller 38 with each of the rotary input shaft 32 and the rotary output shaft 15. This reduction of such a contacting force allows the manual focus ring of the interchangeable lens to be rotated smoothly.

Secondly, operations of the one-way rotational transfer mechanism 30 when a focusing operation is performed in manual focus mode will be hereinafter discussed.

In a state shown in FIG. 6, if the manual focus ring of the interchangeable lens is manually rotated in a forward or reverse rotational direction with no actuation of the AF motor M, this forward or reverse rotation of the manual focus ring is transferred to the focusing mechanism provided in the interchangeable lens to perform a focusing operation (MF operation).

Upon rotation of the manual focus ring being transferred to the focusing mechanism, rotational force is transferred from the focusing ring to the output gear 15c of the rotary output shaft 15. Subsequently, the rotary output shaft 15 rotates clockwise or counterclockwise about the rotational shaft 5, whereas no rotation is transferred from the rotary output shaft 15 to each engageable roller 38 since the inner peripheral surface (cylindrical surface) 15a1 of the rotary output shaft 15 has a circular shape as viewed from the front of the one-way rotational transfer mechanism 30. Therefore, rotation of the rotary output shaft 15 does not cause either the retainer 34 nor any of the differential rollers 36 to rotate, and does not cause the small-diameter portion 32a (the rotary input shaft 32) to rotate either, thus applying no load on the AF motor M.

As can be understood from the above descriptions, effects similar to those obtained in the first embodiment of the one-way rotational transfer mechanism can be obtained in the second embodiment of the one-way rotational transfer mechanism shown in FIGS. 4 through 7. Moreover, due to the utilization of the retainer 34, the annular space RS, which is formed between the small-diameter portion 32a of the rotary input shaft 32 and the rotary output shaft 15, can be used in a space-effective manner. This makes it possible to increase the number of the engageable rollers 38. Increasing the number of the engageable rollers 38 makes it possible to improve the efficiency of transferring torque from the rotary input shaft 32 to the rotary output shaft 15. Furthermore, due to the adoption of the retainer 34, the second embodiment of the one-way rotational transfer mechanism can be easily assembled, and also the number of the differential rollers 36 can be reduced.

Figure 7:
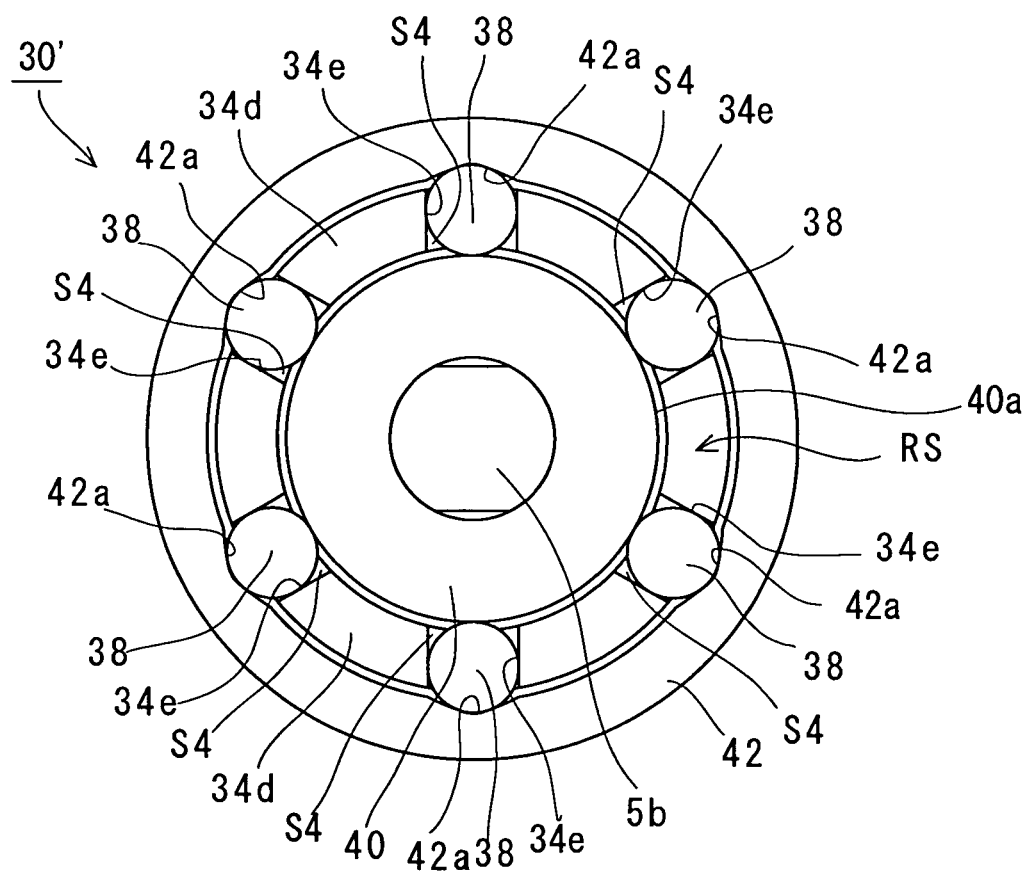
FIG. 7 is a view similar to that of FIG. 6, showing a modification of the second embodiment of the one-way rotational transfer mechanism.

FIG. 7 shows a modification of the second embodiment of the one-way rotational transfer mechanism, in which a rotary input shaft and a rotary output shaft are positioned in a radially reversed fashion; namely, a rotary input shaft 42 is positioned radially outside a hollow-cylindrical rotary output shaft 40.

In the one-way rotational transfer mechanism 30' shown in FIG. 7, the rotary output shaft 40 is rotatably fitted on the large-diameter portion 5b of the rotational shaft 5, while the hollow-cylindrical rotary input shaft 42 is positioned radially outside the rotary output shaft 40 to be rotatable about the axis of the rotational shaft 5. The rotary input shaft 42 is provided, on an inner peripheral surface thereof at equiangular intervals in a circumferential direction of the rotary input shaft 42, with six circumferentially-uneven-depth grooves (circumferentially-uneven-width-space forming portions) 42a which have different radial depths at different circumferential positions. The one-way rotational transfer mechanism 30' is provided between each circumferentially-uneven-depth groove 42a and an outer-peripheral surface (cylindrical surface) 40a of the rotary output shaft 40 with an accommodation space (circumferentially-uneven-width space) S4 having different radial widths at different circumferential positions.

The cylindrical portion 34d of the retainer 34 is positioned in the annular space RS (the accommodation spaces S4) that is formed between the rotary input shaft 42 and the rotary output shaft 40 to be rotatable about the axis of the rotational shaft 5. Although not shown in FIG. 7, the three differential rollers 36 are respectively installed in the three fitting holes 34c that are formed on the front wall 34a of the retainer 34 so that each differential roller 36 can freely rotate on the axis C3 thereof. The six differential rollers 36 are held at all times between a rear surface of a front annular flange (not shown), which projects radially outwards from an outer peripheral surface of the rotational shaft 5 to be orthogonal to the axis of the rotational shaft 5, and a front surface (axially-orthogonal surface) of a rear annular flange (not shown) which is positioned behind the aforementioned front annular flange and which projects radially inwards from an inner peripheral surface of the rotary input shaft 42 to be orthogonal to the axis of the rotational shaft 5. Additionally, the retainer 34 is provided on the cylindrical portion 34d thereof in a circumferential direction with six insertion holes 34e, an engageable roller 38 is installed in each insertion hole 34e to be rotatable about the axis C4 and movable along the axis C4 (the axis C4 extending parallel to the axis of the rotational shaft 5), and the six engageable rollers 38 are positioned in the accommodation spaces S4, respectively.

The rotary input shaft 42 is provided with an input gear (not shown) which is in mesh with the pinion P of the AF motor M, while the rotary output shaft 40 is provided with an output gear (not shown) which is in mesh with the aforementioned input gear of the focusing mechanism provided in the interchangeable lens.

Immediately after the control circuit in the camera body outputs a forward-rotation drive signal or a reverse-rotation drive signal to the AF motor M to rotate the AF motor M in forward or reverse direction, the rotary input shaft 42 rotates clockwise or counterclockwise as viewed in FIG. 7, while each differential roller 36, the retainer 34 and each engageable roller 38 revolve (rotate) in the same rotational direction as the rotary input shaft 42 at a rotational speed half the rotational speed of the rotary input shaft 42. Thereupon, each engageable roller 38 rotates in the associated accommodation space S4 in a rotational direction opposite to the rotational direction of the rotary input shaft 42 to firmly wedge into one of the wedge-shape (radially-narrowed) circumferentially opposite ends of the associated accommodation space S4 between the associated circumferentially-uneven-depth groove 42a of the rotary input shaft 42 and the outer peripheral surface 40a of the rotary output shaft 40. As a result, the rotation of the rotary input shaft 42 is transferred to the rotary output shaft 40 via each engageable roller 38 to rotate the rotary output shaft 40 in the same rotational direction as the rotary input shaft 42 to perform an autofocusing operation.

Similar to the above described second embodiment of the one-way rotational transfer mechanism, in the modification of the second embodiment of the one-way rotational transfer mechanism shown in FIG. 7, immediately after an in-focus state is obtained by the autofocusing operation, the control circuit sends a control signal to the AF motor M to rotate the AF motor M in a rotational direction opposite to the previous rotational direction of the AF motor M for the autofocusing operation by an angle of rotation smaller than backlash between the pinion P and the input gear of the rotary input shaft 42. Thereupon, the rotary input shaft 42 rotates in a rotational direction opposite to the previous rotational direction, in which the rotary input shaft 42 rotated immediately before the aforementioned in-focus state is obtained, without rotating the rotary output shaft 40 to thereby reduce the contacting force of each engageable roller 38 with each of the rotary input shaft 42 and the rotary output shaft 40. This reduction of such a contacting force allows the manual focus ring of the interchangeable lens to be rotated smoothly.

In a state shown in FIG. 7, rotating the manual focus ring of the interchangeable lens causes the rotary output shaft 40 to rotate clockwise or counterclockwise. However, this rotation of the rotary output shaft 40 is not transferred to any of the engageable rollers 38 since the outer peripheral surface 40a of the rotary output shaft 40 has a circular shape as viewed from the front of the one-way rotational transfer mechanism 30', so that rotating the manual focus ring of the interchangeable lens does not cause the rotary input shaft 42 to rotate.

Accordingly, effects similar to those obtained in the second embodiment of the one-way rotational transfer mechanism can be obtained in the modification of the second embodiment of the one-way rotational transfer mechanism shown in FIG. 7.

In each of the above described embodiments of the one-way rotational transfer mechanisms, each differential roller 21 or 36 can be replaced by a simple spherical member and also each engageable roller 23 or 38 can also be replaced by a simple spherical member if the efficiency of transferring torque from the rotary input shaft 7, 27, 32 or 42 to the rotary output shaft 15, 25 or 40, respectively, does not have to be taken into account.

Figure 8:
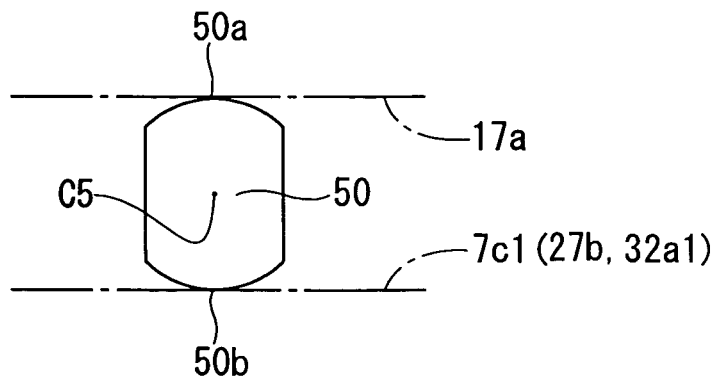
FIG. 8 is a cross sectional view of a modification of a differential roller, taken along a plane orthogonal to the axis of the differential roller.

Each differential roller 21 or 36 can be replaced by a differential roller 50 such as shown in FIG. 8. The differential roller 50 is formed so that an axis C5 thereof extends in a radial direction of the rotary input shaft (7 or 32) or the rotary input shaft (27 or 42), and so that the cross sectional shape of the differential roller 50 is the same as that shown in FIG. 8 at any axial position on the axis C5. In this case, the rotary input shaft (7 or 32) or the rotary input shaft (27 or 42) is rotated via each differential roller 50 in a range so that a pair of arc portions 50a and 50b of the differential roller 50 remain engaged with the pressing surface 17a of the annular member 17 and the axially-orthogonal surface (7c1, 27b or 32a) of the rotary input shaft (7, 27 or 32), respectively, to make each engageable roller 23 or 38 wedge firmly between the rotary input shaft (7 or 32) and the rotary output shaft 15 or between the rotary input shaft (27 or 42) and the rotary output shaft (25 or 40).

In addition, each differential roller 21, 36 or 50 and each engageable roller 23 or 38 can be installed only in a single accommodation space S1, S2, S3 or S4 if the efficiency of transferring torque from the rotary input shaft 7, 27, 32 or 42 to the rotary output shaft 15, 25 or 40 does not have to be taken into account.

The efficiency of transferring torque transferred from the rotary input shaft (7, 27, 32 or 42) to the rotary output shaft (15, 25 or 40) can be changed by the following factors: internal angles of the wedge-shaped opposite end portions that are formed between the outer peripheral surface 15a1 of the large-diameter portion 15a of the rotary output shaft 15 and each side surface 7d1 of the small-diameter portion 7d of the rotary input shaft 7 or between the outer peripheral surface 15a1 and each circumferentially-uneven-depth groove 32e, internal angles of the wedge-shaped opposite ends that are formed between the outer peripheral surface 25a of the rotary output shaft 25 and each side surface 27a of the rotary input shaft 27, or internal angles of the wedge-shaped opposite ends that are formed between the outer peripheral surface 40a of the rotary output shaft 40 and each side surface 42a of the rotary input shaft 42; or by the following factors: the spring force of the compression coil spring 19, the surface friction of the axially-orthogonal surface 7c1, 27b or 32a1 (front surface (axially-orthogonal surface) of the aforementioned rear annular flange of the rotary input shaft 42 in the modification of the second embodiment of the one-way rotational transfer mechanism), and the surface friction of the pressing surface 17a of the annular member 17 (rear surface of the aforementioned front annular flange of the rotational shaft 5 in the modification of the second embodiment of the one-way rotational transfer mechanism).

In addition, although the one-way rotational transfer mechanisms 1, 1', 30 and 30' are installed between the AF motor M and a focusing mechanism of an interchangeable lens in the above described embodiments of the one-way rotational transfer mechanisms, each of the one-way rotational transfer mechanisms 1, 1', 30 and 30' can be installed between a zoom motor provided in a camera body and a zooming mechanism which is provided in an interchangeable lens to be associated with a zoom ring of the interchangeable lens so that rotation of the zoom motor is transferred to the zooming mechanism and so that rotation of the zoom ring is not transferred to the zoom motor. This makes a power zoom operation (motor-driven zooming operation) and a manual zoom operation possible without the need for any switch for switching between power zoom mode and manual zoom mode.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A one-way rotational transfer mechanism comprising:
   a rotary input shaft having an orthogonal surface lying on a plane orthogonal to an axis of said rotary input shaft;
   a hollow-cylindrical rotary output shaft provided around said rotary input shaft to be freely rotatable relative to said rotary input shaft about said axis thereof, said hollow-cylindrical rotary output shaft having a cylindrical inner peripheral surface;
   a circumferentially-uneven-width-space forming portion formed on said rotary input shaft to form at least one accommodation space between said rotary input shaft and said cylindrical inner peripheral surface, said accommodation space having different radial widths at different circumferential positions;
   a differential rotating member installed in said accommodation space, and pressed against said orthogonal surface by a biasing device, said differential rotating member revolving around said axis of said rotary input shaft in a same direction as a rotational direction of said rotary input shaft while revolving at a slower speed than said rotation of said rotary input shaft in association with said rotation of said rotary input shaft; and
   at least one torque transfer member installed in said accommodation space to be freely movable therein, said torque transfer member revolving around said axis of said rotary input shaft in a same rotational direction as said differential rotating member when pressed by said differential rotating member,
   wherein said circumferentially-uneven-width-space forming portion is shaped so that said torque transfer member, which rotates in a circumferential direction about said axis of said rotary input shaft, wedges between said circumferentially-uneven-width-space forming portion and said cylindrical inner peripheral surface of said hollow-cylindrical rotary output shaft in order to transfer a torque from said rotary input shaft to said hollow-cylindrical rotary output shaft when said rotary input shaft is rotated.

2. The one-way rotational transfer mechanism according to claim 1, wherein said rotary input shaft comprises an input gear which is in mesh with an output gear of a reversible motor,
   wherein, upon rotation of said hollow-cylindrical rotary output shaft being stopped, said reversible motor is rotated in a rotational direction opposite to a previous rotational direction thereof by an angle of rotation smaller than backlash between said input gear and said output gear to rotate said rotary input shaft in a rotational direction opposite to a previous rotational direction of said rotary input shaft without rotating said hollow-cylindrical rotary output shaft.

3. The one-way rotational transfer mechanism according to claim 1, wherein said torque transfer member comprises a cylindrical member having an axis parallel to said axis of said rotary input shaft.

4. The one-way rotational transfer mechanism according to claim 1, wherein said differential rotating member comprises a cylindrical member freely rotatable on an axis extending in a radial direction of said rotary input shaft.

5. The one-way rotational transfer mechanism according to claim 1, wherein said differential rotating member is formed as a spherical member.

6. The one-way rotational transfer mechanism according to claim 1, wherein said biasing device comprises a compression coil spring.

7. The one-way rotational transfer mechanism according to claim 1, wherein said torque transfer member comprises a pair of torque transfer members which are positioned on opposite sides of associated said differential rotating member along said circumferential direction in a manner so as to hold said associated said differential rotating member.

8. The one-way rotational transfer mechanism according to claim 1, further comprising a pressing member having a pressing surface which faces said orthogonal surface so as to be parallel thereto,
wherein said pressing member is continuously biased toward said orthogonal surface by said biasing device to hold said differential rotating member between said pressing surface and said orthogonal surface.

9. The one-way rotational transfer mechanism according to claim 1, wherein said accommodation space comprises a plurality of accommodation spaces formed between said circumferentially-uneven-width-space forming portion and said cylindrical inner peripheral surface of said hollow-cylindrical rotary output shaft, and said differential rotating member comprises a plurality of differential rotating members;
wherein at least one of said differential rotating members and said torque transfer member are installed in each of said plurality of accommodation spaces.

10. The one-way rotational transfer mechanism according to claim 1, wherein said circumferentially-uneven-width-space forming portion comprises a portion having a non-circular cross section which includes at least one accommodation-space forming surface for forming said accommodation space between said accommodation-space forming surface and said cylindrical inner peripheral surface of said hollow-cylindrical rotary output shaft.

11. The one-way rotational transfer mechanism according to claim 10, wherein said portion having said non-circular cross section is regular polygonal in cross section.

12. A one-way rotational transfer mechanism comprising:
a hollow-cylindrical rotary input shaft having an orthogonal surface lying on a plane orthogonal to an axis of said hollow-cylindrical rotary input shaft;
a rotary output shaft positioned radially inside said hollow-cylindrical rotary input shaft to be freely rotatable relative to said hollow-cylindrical rotary input shaft about said axis thereof, said rotary output shaft having a cylindrical outer peripheral surface;
a circumferentially-uneven-width-space forming portion formed on an inner peripheral surface of said hollow-cylindrical rotary input shaft to form at least one accommodation space between said hollow-cylindrical rotary input shaft and said cylindrical outer peripheral surface, said accommodation space having different radial widths at different circumferential positions;
a differential rotating member installed in said accommodation space, and pressed against said orthogonal surface by a biasing device, said differential rotating member revolving around said axis of said hollow-cylindrical rotary input shaft in a same direction as a rotational direction of said hollow-cylindrical rotary input shaft while revolving at a slower speed than that of said rotation of said hollow-cylindrical rotary input shaft in association with said rotation of said hollow-cylindrical rotary input shaft; and
at least one torque transfer member installed in said accommodation space to be freely movable therein, said torque transfer member revolving around said axis of said hollow-cylindrical rotary input shaft in a same direction as a revolving direction of said differential rotating member when pressed by said differential rotating member,
wherein said circumferentially-uneven-width-space forming portion is shaped so that said torque transfer member which revolves in a circumferential direction about said axis of said hollow-cylindrical rotary input shaft wedges between said circumferentially-uneven-width-space forming portion and said cylindrical outer peripheral surface of said rotary output shaft to transfer a torque from said hollow-cylindrical rotary input shaft to said rotary output shaft when said hollow-cylindrical rotary input shaft is rotated.

13. The one-way rotational transfer mechanism according to claim 12, wherein said rotary input shaft comprises an input gear which is in mesh with an output gear of a reversible motor,
wherein, upon rotation of said rotary output shaft being stopped, said reversible motor is rotated in a rotational direction opposite to a previous rotational direction thereof by an angle of rotation smaller than backlash between said input gear and said output gear to rotate said rotary input shaft in a rotational direction opposite to a previous rotational direction of said rotary input shaft without rotating said rotary output shaft.

14. The one-way rotational transfer mechanism according to claim 12, wherein said torque transfer member comprises a cylindrical member having an axis parallel to said axis of said rotary input shaft.

15. The one-way rotational transfer mechanism according to claim 12, wherein said differential rotating member comprises a cylindrical member freely rotatable on an axis extending in a radial direction of said rotary input shaft.

16. The one-way rotational transfer mechanism according to claim 12, wherein said differential rotating member is formed as a spherical member.

17. The one-way rotational transfer mechanism according to claim 12, wherein said biasing device comprises a compression coil spring.

18. The one-way rotational transfer mechanism according to claim 12, wherein said torque transfer member comprises a pair of torque transfer members which are positioned on opposite sides of associated said differential rotating member along said circumferential direction in a manner so as to hold said associated said differential rotating member.

19. The one-way rotational transfer mechanism according to claim 12, further comprising a pressing member having a pressing surface which faces said orthogonal surface so as to be parallel thereto,
wherein said pressing member is continuously biased toward said orthogonal surface by said biasing device to hold said differential rotating member between said pressing surface and said orthogonal surface.

20. The one-way rotational transfer mechanism according to claim 12, wherein said accommodation space comprises a plurality of accommodation spaces formed between said circumferentially-uneven-width-space forming portion and said cylindrical outer peripheral surface of said rotary output shaft, and said differential rotating member comprises a plurality of differential rotating members;

wherein at least one of said differential rotating members and said torque transfer member are installed in each of said plurality of accommodation spaces.

21. A one-way rotational transfer mechanism comprising:
a rotary input shaft having an orthogonal surface lying on a plane orthogonal to an axis of said rotary input shaft;
a hollow-cylindrical rotary output shaft provided around said rotary input shaft to be freely rotatable relative to said rotary input shaft about said axis thereof, said hollow-cylindrical rotary output shaft having a cylindrical inner peripheral surface;
a circumferentially-uneven-width-space forming portion formed on said rotary input shaft to form an annular space including at least one accommodation space between said rotary input shaft and said cylindrical inner peripheral surface, said accommodation space having different radial widths at different circumferential positions;
a differential rotating member pressed against said orthogonal surface by a biasing device, said differential rotating member revolving around said axis of said rotary input shaft in a same direction as a rotational direction of said rotary input shaft while revolving at a slower speed than said rotation of said rotary input shaft in association with said rotation of said rotary input shaft;
a retainer installed in said annular space, and rotating around said axis of said rotary input,shaft in a same direction as the revolving direction of said differential rotating member when pressed by said differential rotating member; and
at least one torque transfer member supported by said retainer to rotate together with said retainer in said accommodation space,
wherein said circumferentially-uneven-width-space forming portion is shaped so that said torque transfer member which rotates in a circumferential direction about said axis of said rotary input shaft wedges between an outer peripheral surface of said rotary input shaft and said cylindrical inner peripheral surface of said hollow-cylindrical rotary output shaft to transfer a torque from said rotary input shaft to said hollow-cylindrical rotary output shaft when said rotary input shaft is rotated.

22. The one-way rotational transfer mechanism according to claim 21, wherein said rotary input shaft comprises an input gear which is in mesh with an output gear of a reversible motor,
wherein, upon rotation of said rotary output shaft being stopped, said reversible motor is rotated in a rotational direction opposite to a previous rotational direction thereof by an angle of rotation smaller than backlash between said input gear and said output gear to rotate said rotary input shaft in a rotational direction opposite to a previous rotational direction of said rotary input shaft without rotating said rotary output shaft.

23. The one-way rotational transfer mechanism according to claim 21, wherein said torque transfer member comprises a cylindrical member having an axis parallel to said axis of said rotary input shaft.

24. The one-way rotational transfer mechanism according to claim 21, wherein said differential rotating member comprises a cylindrical member freely rotatable on an axis extending in a radial direction of said rotary input shaft.

25. The one-way rotational transfer mechanism according to claim 21, wherein said differential rotating member is formed as a spherical member.

26. The one-way rotational transfer mechanism according to claim 21, wherein said biasing device comprises a compression coil spring.

27. The one-way rotational transfer mechanism according to claim 21, further comprising a pressing member having a pressing surface which faces said orthogonal surface so as to be parallel thereto,
wherein said pressing member is continuously biased toward said orthogonal surface by said biasing device to hold said differential rotating member between said pressing surface and said orthogonal surface.

28. The one-way rotational transfer mechanism according to claim 21, wherein said accommodation space comprises a plurality of accommodation spaces formed between said circumferentially-uneven-width-space forming portion and said cylindrical inner peripheral surface of said hollow-cylindrical rotary output shaft, and
wherein said torque transfer member is installed in each of said plurality of accommodation spaces.

29. The one-way rotational transfer mechanism according to claim 21, wherein said circumferentially-uneven-width-space forming portion comprises circumferentially-uneven-depth grooves having different radial depths at different circumferential positions.

30. The one-way rotational transfer mechanism according to claim 29, wherein said circumferentially-uneven-depth grooves are positioned at equi-angular intervals in a circumferential direction of said rotary input shaft.

31. A one-way rotational transfer mechanism comprising:
a hollow-cylindrical rotary input shaft having an orthogonal surface lying on a plane orthogonal to an axis of said rotary input shaft;
a rotary output shaft positioned radially inside said hollow-cylindrical rotary input shaft to be freely rotatable relative to said hollow-cylindrical rotary input shaft about said axis thereof, said rotary output shaft having a cylindrical outer peripheral surface;
a circumferentially-uneven-width-space forming portion formed on said hollow-cylindrical rotary input shaft to form an annular space including at least one accommodation space between said hollow-cylindrical rotary input shaft and said cylindrical outer peripheral surface, said accommodation space having different radial widths at different circumferential positions;
a differential rotating member pressed against said orthogonal surface by a biasing device, said differential rotating member revolving around said axis of said hollow-cylindrical rotary input shaft in a same direction as a rotational direction of said hollow-cylindrical rotary input shaft while revolving at a slower speed than rotation of said hollow-cylindrical rotary input shaft in association with said rotation of said hollow-cylindrical rotary input shaft;
a retainer installed in said annular space, and rotating around said axis of said hollow-cylindrical rotary input shaft in a same rotational direction as said differential rotating member when pressed by said differential rotating member; and
at least one torque transfer member supported by said retainer to rotate together with said retainer in said accommodation space,
wherein said circumferentially-uneven-width-space forming portion is shaped so that said torque transfer member which rotates in a circumferential direction about said axis of said hollow-cylindrical rotary input shaft wedges between an inner peripheral surface of said hollow-cylindrical rotary input shaft and said cylindrical outer peripheral surface of said rotary output shaft to transfer a torque from said hollow-cylindrical rotary input shaft to said rotary output shaft when said hollow-cylindrical rotary input shaft is driven to rotate.

32. The one-way rotational transfer mechanism according to claim 31, wherein said rotary input shaft comprises an input gear which is in mesh with an output gear of a reversible motor, wherein, upon rotation of said rotary output shaft being stopped, said reversible motor is rotated in a rotational direction opposite to a previous rotational direction thereof by an angle of rotation smaller than backlash between said input gear and said output gear to rotate said rotary input shaft in a rotational direction opposite to a previous rotational direction of said rotary input shaft without rotating said rotary output shaft.

33. The one-way rotational transfer mechanism according to claim 31, wherein said torque transfer member comprises a cylindrical member having an axis parallel to said axis of said rotary input shaft.

34. The one-way rotational transfer mechanism according to claim 31, wherein said differential rotating member comprises a cylindrical member freely rotatable on an axis extending in a radial direction of said rotary input shaft.

35. The one-way rotational transfer mechanism according to claim 31, wherein said differential rotating member is formed as a spherical member.

36. The one-way rotational transfer mechanism according to claim 31, wherein said biasing device comprises a compression coil spring.

37. The one-way rotational transfer mechanism according to claim 31, further comprising a pressing member having a pressing surface which faces said orthogonal surface so as to be parallel thereto, wherein said pressing member is continuously biased toward said orthogonal surface by said biasing device to hold said differential rotating member between said pressing surface and said orthogonal surface.

38. The one-way rotational transfer mechanism according to claim 31, wherein said accommodation space comprises a plurality of accommodation spaces formed between said circumferentially-uneven-width-space forming portion and said cylindrical outer peripheral surface of said rotary output shaft, and wherein said torque transfer member is installed in each of said plurality of accommodation spaces.

39. The one-way rotational transfer mechanism according to claim 31, wherein said circumferentially-uneven-width-space forming portion comprises circumferentially-uneven-depth grooves having different radial depths at different circumferential positions.

40. The one-way rotational transfer mechanism according to claim 39, wherein said circumferentially-uneven-depth grooves are positioned at equi-angular intervals in a circumferential direction of said hollow-cylindrical rotary input shaft.

* * * * *